United States Patent [19]

Maher

[11] Patent Number: 4,853,653

[45] Date of Patent: Aug. 1, 1989

[54] MULTIPLE INPUT CLOCK SELECTOR

[75] Inventor: Steven C. Maher, Cedar Rapids, Iowa

[73] Assignee: Rockwell International Corporation, El Segundo, Calif.

[21] Appl. No.: 184,849

[22] Filed: Apr. 25, 1988

[51] Int. Cl.$^4$ ............................................. H03K 17/16
[52] U.S. Cl. ........................................ 331/49; 328/63; 328/137
[58] Field of Search .......................... 331/49; 307/243; 328/61, 63, 137; 375/66

[56] References Cited

U.S. PATENT DOCUMENTS

| | | | |
|---|---|---|---|
| 3,226,648 | 12/1965 | Davidson | 331/49 X |
| 3,932,816 | 1/1976 | MacGregor | 307/243 X |
| 4,015,220 | 3/1977 | Kaufman | 331/179 |
| 4,109,208 | 8/1978 | Tomisawa et al. | 328/13 |
| 4,229,699 | 10/1980 | Frissell | 307/243 X |
| 4,419,629 | 12/1983 | O'Brien | 328/72 |
| 4,593,390 | 6/1986 | Hildebrand et al. | 370/112 |

*Primary Examiner*—Siegfried H. Grimm
*Attorney, Agent, or Firm*—John C. McFarren; M. Lee Murrah; H. Fredrick Hamann

[57] ABSTRACT

A multiple input clock selector is provided for switching asynchronously from one to another of a plurality of oscillators that generate clock signals having different frequencies. The clock selector has a plurality of sections corresponding to the plurality of oscillators. Each section of the clock selector comprises an initial AND gate, a pair of flip-flops, and a final AND gate all connected in series. The oscillator signal for each section is applied to the final AND gate and to the flip-flops as a clock input. An inverted signal from the second flip-flop of each section is fed back as an input to the initial AND gates of all the other sections. An oscillator select signal is also provided as an input to the initial AND gate of each section. The outputs of all the final AND gates pass through an OR gate that provides the selected clock output. The clock selector switches between oscillators as determined by the select signals without producing runt pulses, metastable conditions, or other anomalous signals.

15 Claims, 1 Drawing Sheet

MULTIPLE INPUT CLOCK SELECTOR

TECHNICAL FIELD

The present invention relates to electronic oscillators and, in particular, to a circuit for switching asynchronously from one to another of a plurality of oscillators that generate clock signals having different frequencies.

BACKGROUND OF THE INVENTION

In certain electrical devices it is necessary to select and switch among a number of clock source oscillators that are asynchronous with respect to each other. Generally, it is desirable to switch between oscillators without generating runt pulses or electrical glitches. The conventional approach to clock selection and switching requires the use of a multiplexer. However, the use of a multiplexer can produce unwanted runt pulses, metastable conditions, and other anomalies.

One particular application in which a clock selector is useful is the frame rate conversion process performed by some video processing systems. Such video processing systems typically consist of a dual banked memory in which one bank of the memory is filled while the other bank is emptied. Because the recesses of filling and emptying the memory banks are generally asynchronous, it is necessary to switch the memory banks from one clock source to another without anomalous effects.

The prior art clock selector systems generally have long latency times in switching, or they have complex circuitry that attempts to find a point at which switching can occur without the generation of switching anomalies. Although such prior art systems may prevent metastability problems, typically they do not address the problem of generating clock pulses during the switching period that do not obey either of the clock specifications.

Therefore, there is a need for a relatively simple circuit for selecting and switching from one to another of a plurality of clock sources having different frequencies without generating runt pulses, electrical glitches, metastable conditions, or other anomalies.

SUMMARY OF THE INVENTION

The present invention is a circuit that selects and switches asynchronously from one to another of a plurality of oscillator signals without generating runt pulses or other anomalous signals. For each input oscillator signal, the clock selector comprises a section having a select line, an initial AND gate, two flip-flops, and a final AND gate all connected in series. Each oscillator signal is input to its section's final AND gate and is applied to its section's flip-flops as a clock input. The select line associated with each oscillator signal is provided to its section's initial AND gate, the output of which is the D input of the first flip-flop, the Q output of which is the D input of the second flip-flop. The Q output of the second flip-flop is provided to the final AND gate along with that section's oscillator signal. The $\bar{Q}$ output of the second flip-flop of each section is fed back as an input to the initial AND gates associated with all the other sections. The outputs of all the final AND gates are input to an OR gate, the output of which is the selected clock signal.

The oscillator signals are inverted when applied to their respective flip-flops so that the flip-flops change state only on the falling edge of a clock signal. The clock selector circuit of the present invention is inherently self starting in that it will stabilize on power-up after two clock cycles of the lowest frequency oscillator signal. If no anomalous clock signals can be tolerated at power-up, a power-on reset signal may be connected to the presets of one set of flip-flops and to the clears of the other set of flip-flops. This will generate a valid clock output following power-on reset.

Switching to a new oscillator signal is accomplished by driving the select line for the new oscillator high and all other select lines low. As the deselected oscillator's select line goes low, the $\bar{Q}$ for the deselected oscillator goes high after two falling edges of the oscillator signal. The $\bar{Q}$ high is fed back to the initial AND gate of the newly selected oscillator. After two falling edges of the selected oscillator signal, a high from the flip-flops is combined with the selected oscillator signal at the final AND gate to produce the selected clock output. The $\bar{Q}$ output of the flip-flop corresponding to the selected oscillator signal goes low and is fed back to the initial AND gates corresponding to all the other oscillators to ensure that the other oscillator signals remain deselected. Thus, the output clock signal will remain low after two falling edges of the deselected oscillator signal and will continue low through two falling edges of the selected oscillator signal, whereupon it will provide the selected oscillator signal as the output clock.

BRIEF DESCRIPTION OF THE DRAWINGS

For a more complete understanding of the present invention and for further advantages thereof, reference is made to the following Description of the Preferred Embodiment taken in conjunction with the accompanying Drawings, in which.

DESCRIPTION OF THE PREFERRED EMBODIMENT

Figure 1:
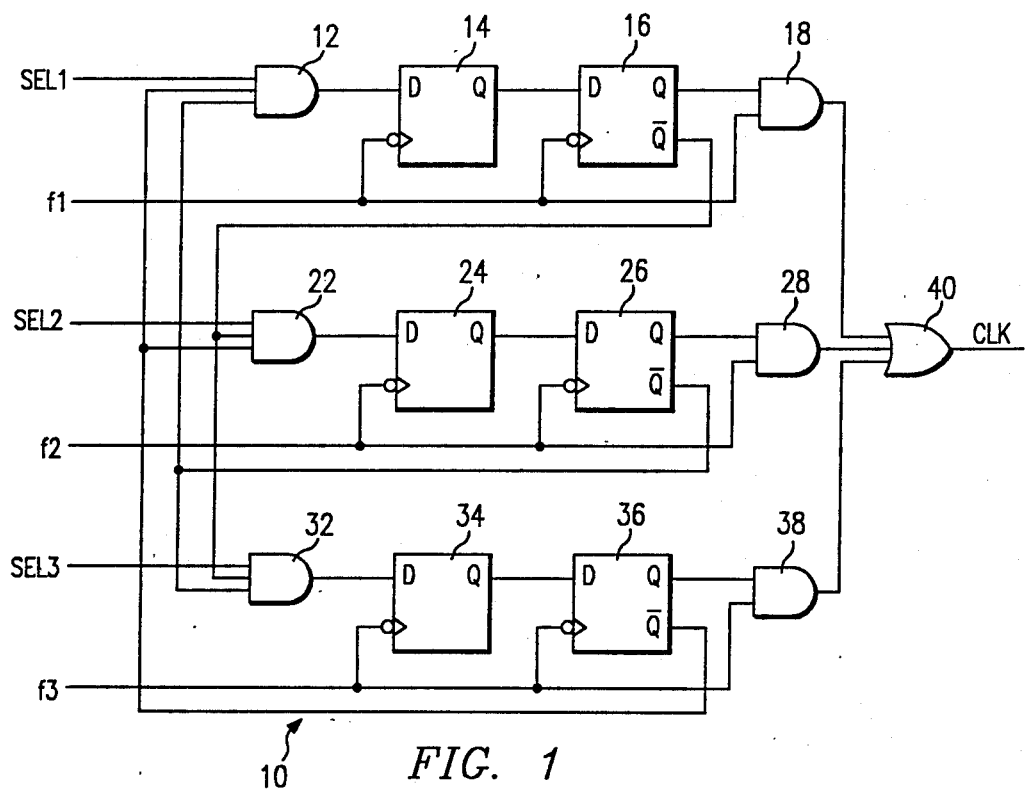
FIG. 1 is a schematic diagram of a clock selector of the present invention having three oscillator inputs and one clock output.

Referring to FIG. 1, reference numeral 10 designates one embodiment of a multiple input clock selector of the present invention. Clock selector 10 is connected to three oscillators (not shown) that provide signals f1, f2, and f3, respectively, having generally unrelated frequencies. Clock selector 10 selects and switches among signals f1, f2, and f3 to produce an output clock signal CLK without producing runt pulses or other anomalous signals during the switching operation.

Clock selector 10 comprises three identical sections. Each section of clock selector 10 is associated with one of the corresponding oscillator signals f1, f2, and f3. The section of clock selector 10 associated with oscillator signal f1 comprises a first select line SEL1, an initial AND gate 12, a first flip-flop 14, a second flip-flop 16, and a final AND gate 18. Oscillator signal f1 is provided as an inverted clock input to flip-flops 14 and 16 and is input to final AND gate 18. Likewise, clock selector 10 includes sections associated with oscillator signals f2 and f3 including SEL2, initial AND gate 22, flip-flops 24 and 26, and final AND gate 28, and SEL3, initial AND gate 32, flip-flops 34 and 36, and final AND gate 38, respectively. The outputs of AND gates 18, 28, and 38 are input to OR gate 40 that provides output clock signal CLK.

The oscillator signals f1, f2, and f3 are inverted when applied to their respective flip-flops so that each flip-flop can change its state only on a falling edge of its respective oscillator signal. The $\overline{Q}$ signal from each of the second flip-flops 16, 26, and 36, respectively, is fed back as an input to the initial AND gates in all of the sections of clock selector 10 other than its own. For example, the $\overline{Q}$ signal from flip-flop 16 is input to initial AND gates 22 and 32 but not to its own section's initial AND gate 12. Clock selector 10 can be adapted for any number of oscillator signals simply by adding additional sections comprising initial and final AND gates and first and second flip-flops. In the general multiple input case, each initial AND gate has inputs comprising its own section's select signal plus the $\overline{Q}$ signals from all the other sections. The outputs from all the final AND gates are input to OR gate 40, which provides the selected clock output CLK.

Figure 2:
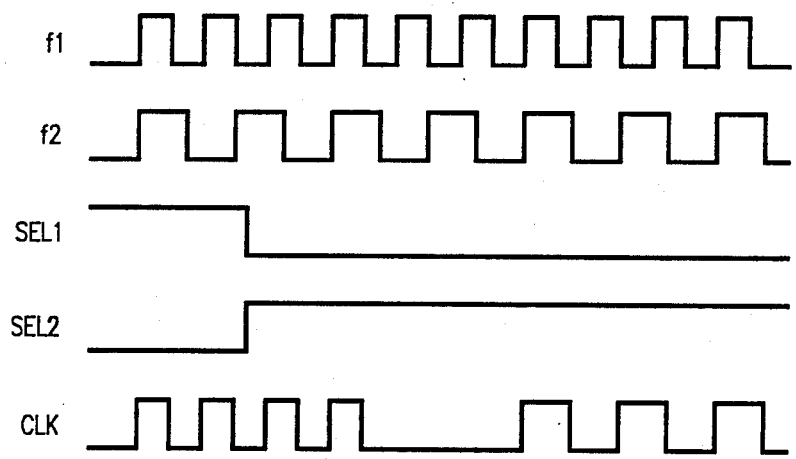
FIG. 2 is a timing diagram that illustrtes switching between two of the oscillator inputs of the clock selector illustrated in FIG. 1.

The operation of clock selector 10 can be more fully understood by reference to the timing diagram illustrated in FIG. 2. Although clock selector 10 will "walk out" of any random initial state in at most two clock periods of each of the two lowest frequency oscillator signals, FIG. 2 assumes the initial conditions of SEL1 high and SEL2 and SEL3 low. FIG. 2 illustrates switching between oscillator signals f1 and f2 while SEL3 remains low throughout the operation. With SEL1 high and all other select signals low, the $\overline{Q}$ outputs of flip-flops 26 and 36 are high. With all inputs to initial AND gate 12 high, the D inputs and Q outputs of flip-flops 14 and 16 become high so that final AND gate 18 outputs oscillator signal f1 to OR gate 40. The $\overline{Q}$ output of flip-flop 16 goes low and is input to AND gates 22 and 32 to "lock-out" oscillator signals f2 and f3 by forcing the outputs of AND gates 22 and 32 low.

As shown in FIG. 2, oscillator signal f1 is deselected by pulling SEL1 low, and oscillator signal f2 is selected by driving SEL2 high. SEL1 must go low before the switching to any other oscillator signal can be accomplished. However, there is no requirement that SEL2 must go high at the same time SEL1 goes low. To accomplish clock switching in the minimum time, SEL2 may go high anytime during the period from before SEL1 goes low up until the time of the second falling edge of oscillator signal f1 and SEL1 has gone low.

When SEL1 goes low, the Q output of flip-flop 14 goes low on the first falling edge of oscillator signal f1. Thereafter, the Q output of the flip-flop 16 goes low on the second falling edge of oscillator signal f1. Also, $\overline{Q}$ goes high on the second falling edge of oscillator signal f1 so that the output of AND gate 22 can go high when SEL2 goes high. When the Q output of flip-flop 16 goes low, the output of gate 40 goes low until oscillator signal f2 has been selected. With SEL1 and SEL3 low and SEL2 high, the Q output of flip-flop 24 goes high on the next falling edge of oscillator signal f2. Thereafter, the Q output of flip-flop 26 goes high and the $\overline{Q}$ output goes low on the second falling edge of oscillator signal f2. Thus, the output of final AND gate 28 is oscillator signal f2, which becomes the new clock signal CLK output from OR gate 40.

It can be seen that deselection of one oscillator signal requires two clock periods of that signal, and selection of a new oscillator signal requires two clock periods of the new signal. However, clock selector 10 accomplishes switching between oscillators without producing runt pulses, metastable conditions, or other anomalous effects. Furthermore, the select signals SEL1, SEL2, and SEL3 can be asynchronous with respect to any of the oscillator signals f1, f2, and f3. The pair of flip-flops in each section of clock selector 10 provide a measure of metastability hardening so that no synchronization is required between the select signals and the oscillator signals. The amount of metastability hardening can be increased by adding additional stages of flip-flops between the first and second flip-flops illustrated in each section of clock selector 10 in FIG. 1.

Clock selector 10 takes two cycles of each of the two oscillator signals to accomplish switching between those two signals (assuming that there is a delay of less than two cycles between deselection of one select line and selection of the other select line). However, this switching time can be reduced by various schemes. For example, switching between oscillator signals can take place within one cycle of each of the two signals by clocking the two flip-flops in a given section with the opposite edges of the oscillator signal for that section.

The select lines for clock selector 10 may be derived from a demultiplexer such as a 3 to 8 decoder. However, it is possible to eliminate the demultiplexer and use additional terms in the AND gates to perform the same function.

Although the present invention has been described with respect to a specific embodiment thereof, various changes and modifications may be suggested to one skilled in the art, and it is intended that the present invention emcompass such changes and modifications as fall within the scope of the appended claims.

I claim:

1. A clock selector, comprising:
    first and second initial logic gates for receiving, respectively, first and second select signals;
    first and second final logic gates for receiving, respectively, first and second oscillator signals;
    a first flip-flop connected in series between said first initial and final logic gates;
    a second flip-flop connected in series between said second initial and final logic gates; and
    an output from said first flip-flop connected to said second initial logic gate and an output from said second flip-flop connected to said first initial logic gate.

2. The clock selector of claim 1, further comprising an OR gate connected to receive the outputs of said first and second final logic gates and to provide a selected clock output.

3. The clock selector of claim 2, wherein said first and second oscillator signals are provided, respectively, as clock inputs to said first and second flip-flops.

4. The clock selector of claim 2, further comprising at least one additional flip-flop connected in series between each of said first and second initial logic gates and said first and second flip-flops, respectively.

5. The clock selector of claim 2, wherein said initial logic gates and said final logic gates are AND gates.

6. A multiple input clock selector, comprising:
    a plurality of initial logic gates for receiving, respectively, a corresponding plurality of select signals;
    a plurality of final logic gates for receiving, respectively, a corresponding plurality of oscillator signals;
    a plurality of flip-flops, one of said flip-flops connected in series between each of said initial and final logic gates; and an output from each of said flip-flops fed back to all of said initial logic gates except the initial logic gate connected to provide an input to the flip-flop providing said feedback.

7. The multiple input clock selector of claim 7, further comprising an OR gate connected to receive the outputs of said plurality of final logic gates and for providing a selected clock output.

8. The multiple input clock selector of claim 7, wherein each of said plurality of oscillator signals is provided as a clock input to its corresponding flip-flop.

9. The multiple input clock selector of claim 7, further comprising an additional flip-flop connected in series between each of said plurality of initial logic gates and said plurality of flip-flops.

10. The multiple input clock selector of claim 7, wherein said plurality of initial and final logic gates comprise AND gates.

11. An electrical circuit for switching asynchronously from one to another of a plurality of oscillator signals having different frequencies, the circuit having a plurality of sections corresponding to the plurality of oscillator signals, each section comprising:

an initial logic gate for receiving a select signal;
a first flip-flop connected for receiving an output of said initial logic gate;
a final logic gate connected for receiving one of the oscillator signals and a first output of said first flip-flop; and
a second output from said first flip-flop fed back to the initial logic gates of all the other of said plurality of sections.

12. The electrical circuit of claim 11, further comprising an OR gate connected to receive the outputs of all of said final logic gates and for providing a selected clock output.

13. The electrical circuit of claim 12, wherein said one of the oscillator signals is provided to said flip-flop as a clock input.

14. The electrical circuit of claim 12, further comprising a second flip-flop connected in series between said initial logic gate and said first flip-flop.

15. The electrical circuit of claim 12, wherein said initial logic gate and said final logic gate comprise AND gates.

* * * * *